Aug. 30, 1932.  A. STRICKLER ET AL  1,874,140
MEANS FOR TREATING CUTANEOUS AFFECTIONS
Filed May 25, 1931  2 Sheets-Sheet 2
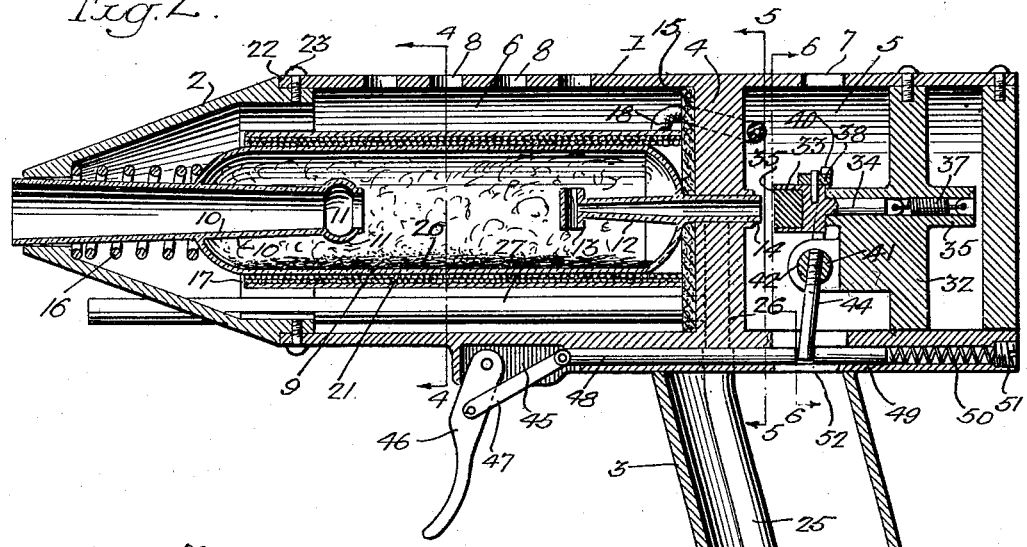
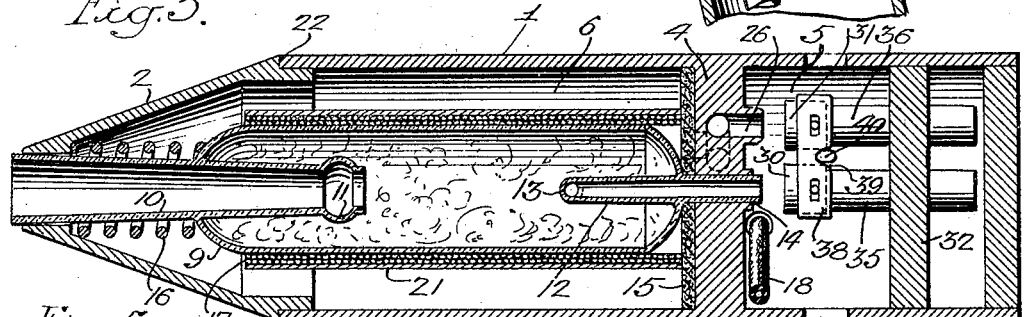
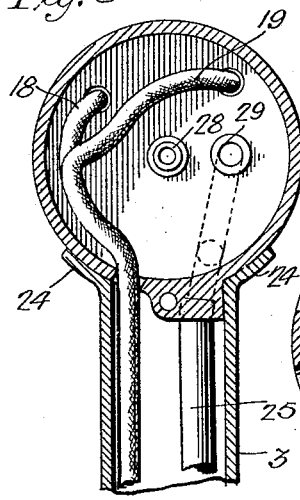
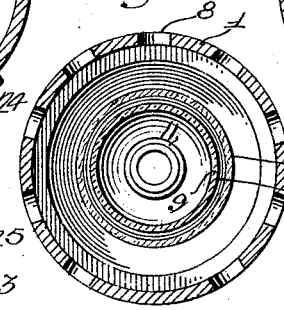
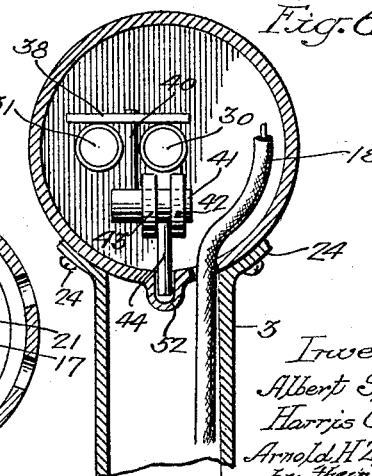
Inventors:-
Albert Strickler
Harris Comer
Arnold H Zifferblatt
by their Attorneys
Howson & Howson Patented Aug. 30, 1932

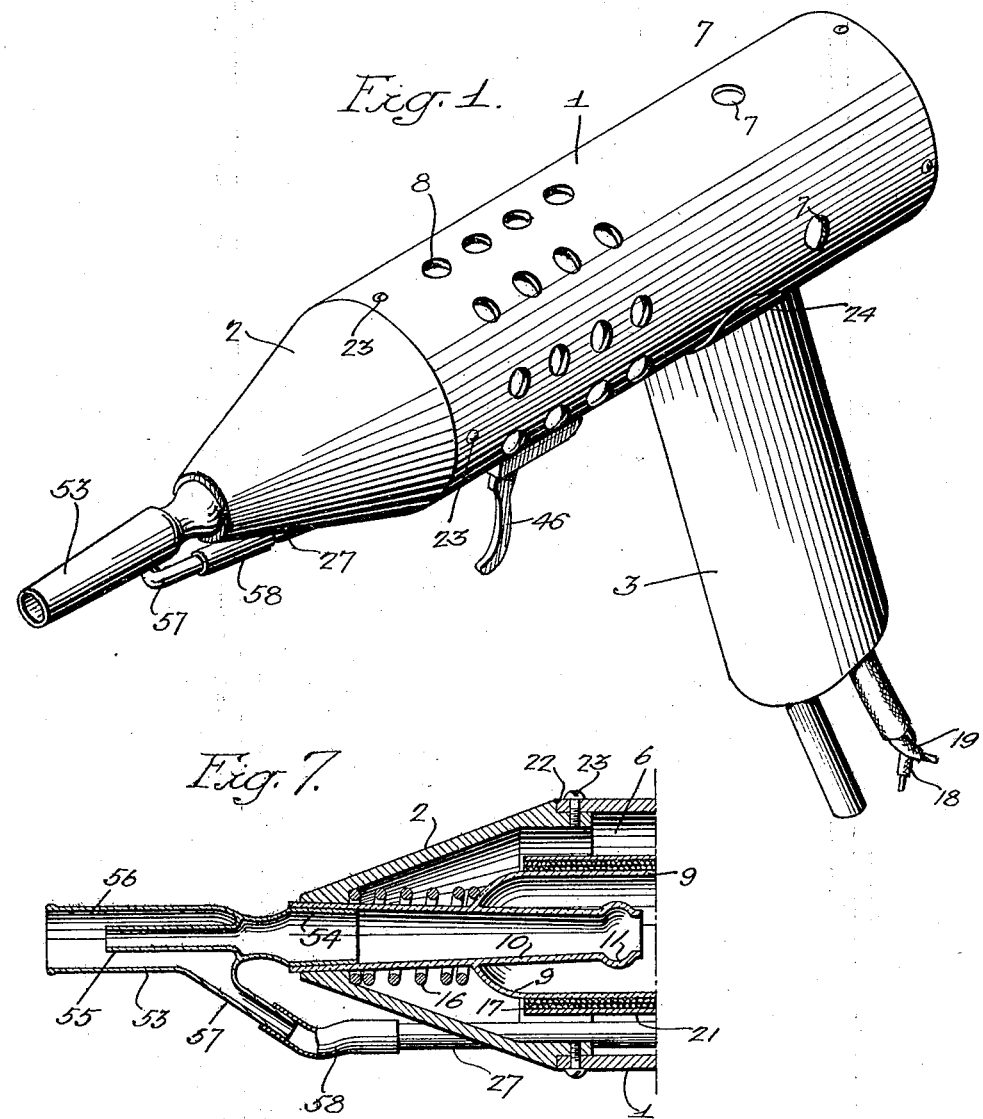

1,874,140

UNITED STATES PATENT OFFICE

ALBERT STRICKLER, OF PHILADELPHIA, HARRIS COMER, OF CYNWYD, AND ARNOLD H. ZIFFERBLATT, OF PHILADELPHIA, PENNSYLVANIA, ASSIGNORS, BY MESNE ASSIGNMENTS, TO HENAL COMPANY, OF WILMINGTON, DELAWARE, A CORPORATION OF DELAWARE

MEANS FOR TREATING CUTANEOUS AFFECTIONS

Application filed May 25, 1931. Serial No. 539,928.

This invention relates to improvements in methods and means for treating cutaneous affections and is particularly adapted to the treatment of mycotic and pyogenic cutaneous affections.

The principal object and purpose of the invention is to provide such a method and means as will enable the complete penetration of an affected portion of the skin with a medicinal agent and cause the epidermal tissues to retain such agent.

Absence of a definite method of treatment of mycotic (ring worm) infections of the feet and hands coupled with numerical increase of this cutaneous affection had focused the attention of dermatologists upon this problem. During the conduct of an investigation dealing with various treatments and formulæ advocated for mycotic infections of the feet and hands, we conceived the method of the present invention for the treatment of this affection and devised the device disclosed herein for carrying out such method of treatment. The method involved consists essentially in creating a vacuum adjacent the portion of the skin to be treated, thereby increasing the vascularity of such portion, and then projecting a vaporized medicament on to the affected portion during the existence of the vacuum. The vacuum created adjacent the affected portion of the skin stimulates the epidermal tissues and draws the blood near the surface of the skin. Thus, the affected portion is caused to readily absorb the medicament and the tissues retain the same. The device disclosed herein and constructed in accordance with the principles of the invention performs this method in the desired manner, as will be fully apparent hereinafter.

The above and other objects and features of the invention will be fully understood as the description proceeds. Reference may be had to the following description and the accompanying drawings for a complete understanding of the invention. In the drawings:

Fig. 1 is a perspective view of a device constructed in accordance with the principle of the invention;

Fig. 2 is an elevational section of the device of Fig. 1 without the emission nozzle attached thereto;

Fig. 3 is a horizontal section taken through the center of the body portion of the device of Fig. 1;

Fig. 4 is a sectional view along line 4—4 of Fig. 2;

Fig. 5 is a sectional view along line 5—5 of Fig. 2;

Fig. 6 is a sectional view along line 6—6 of Fig. 2; and

Fig. 7 is a sectional view of the emission end of the device.

Referring to the several views of the drawings, the device constructed in accordance with the present invention and adapted to carry out the novel method involved preferably takes the shape and form of a gun as clearly illustrated in Fig. 1. As will be described in detail hereinafter, the trigger when actuated causes the device to create a vacuum adjacent the portion of the skin being treated and when released functions to cause the emission of the vaporized medicament and the destruction of the vacuum.

Referring particularly to Figs. 2 to 7 of the drawings, which illustrate the various details of the device, it will be noted that the device comprises generally a cylindrical body 1, a tapered end member 2 removably attached thereto, and a handle 3 also attached to the body. These elements may, of course, be formed of any suitable material but it is desirable to form them of suitable metal, preferably aluminum, which is light in weight but sufficiently durable. The body of the device constitutes a housing or casing which is divided by an integral diaphragm 4 into two compartments or chambers 5 and 6. The casing is provided with sets of apertures 7 and 8 about its periphery to admit air to the compartments and provide the desired ventilation of the device.

In accordance with our invention, we dispose within chamber 6 a retort 9 for the purpose of storing the medicinal agent, as will appear more clearly hereinafter. This retort is formed of glass and preferably of the type known as "pyrex", since such glass is very durable and able to withstand high temperatures. The retort carries at one end a tapered outlet or emission tube 10 having a bell-shaped end 11, the tube being formed integrally with the end wall of the retort. The purpose of the bell-shaped portion 11 is to prevent adherence to that part of the tube of the medicament when in its powdered form, as will be clearly apparent hereinafter. Formed integrally with the opposite end of the retort is an inlet tube 12 having a T head 13 at its inner end. The purpose of this construction will be clearly set forth hereinafter. The outer end of tube 10 is adapted to project through the opening in the small end of member 2 of the device, while the extending outer end of tube 12 projects through a centrally disposed opening 14 in diaphragm 4.

The retort 9 and its integral tubes are not mechanically attached within the device but are resiliently mounted therein. As shown clearly in Figs. 2 and 3, a layer of asbestos 15 is provided on one side of diaphragm 4 against which an end of retort 9 abuts. At the other end of the retort, a spiral spring 16 is interposed between the end of the retort and an annular ledge formed inside member 2. It will be obvious that the tubes carried at each end of the retort support the retort within chamber 6 of the device, while spring 16 resiliently forces the retort against the asbestos layer 15. Thus the retort assembly is supported within the chamber in the desired manner.

Retort 9 carries about its peripheral surface an electrical heating coil 17 which may be connected by means of suitable conductors 18 and 19 passing through apertures in diaphragm 4 to a source of current (not shown). The purpose of this heating coil is to heat the medicinal agent which is disposed within retort 9 to vaporize the same. The vaporized medicament is designated by reference character 20. An asbestos sleeve 21 is also provided about retort 9 and encircles the heating coil. It will be apparent that this sleeve, in conjunction with layer 15, forms a heat insulating jacket about the retort so that as little heat as possible escapes. In order to make compartment 6 accessible for insertion therein of the retort assembly or the removal of such assembly for any purpose, the tapered end member 2 is removably attached to casing 1 of the device. To this end, an annular recessed seat 22 is provided about the inner enlarged end of member 2 and one end of casing 1 is adapted to snugly rest in such seat. Suitable screws 23 may be provided about the periphery of the device for attaching these members together.

Handle 3 of the device may be provided with upwardly extending ears 24 which are adapted to engage casing 1 for attachment thereto. Suitable screws may be provided for attaching these members together. As shown clearly in Fig. 2, the handle not only serves as such but is hollow to serve also as a conduit for the conductors leading to the heating coil of the device and for pipe 25. One end of this pipe is connected by means of a suitable rubber tube to a suitable source of vacuum (not shown). The invention contemplates the use of any such source. For example, a water driven pump may be attached to an ordinary water faucet, which pump may function to exhaust the air through pipe 25, as will be set forth hereinafter. Pipe 25 extends through the handle and upward through a passage 26 provided in diaphragm 4, such passage leading into chamber 5 at a point adjacent the protruding end of tube 12 (see Fig. 5). A second pipe 27 extends from pipe 25 to the nozzle of the device, as shown in Fig. 7. The nozzle will be described in detail later.

In accordance with the invention, a pair of valve seats 28 and 29 (see Fig. 5) are provided on diaphragm 4. The outer end of inlet tube 12 constitutes the centrally disposed valve seat 28, while the end of pipe 25 constitutes valve seat 29, the latter seat being horizontally disposed and slightly offset with respect to seat 28. Co-acting with these valve seats respectively is a pair of valves 30 and 31 (see Fig. 6). A valve support 32 is disposed within compartment 5, as illustrated clearly in Figs. 2 and 3. Each of the valves comprises a recessed head 33 and an extending stem 34. The recessed head of each valve carries a rubber block 35 (see Fig. 2), which is adapted to resiliently seat against its particular valve seat. The valve support is formed to provide integral boss portions 35 and 36 which slidably receive the stems of the valves. Each valve is biased by a spring 37 carried by the boss and connected to the valve stem.

Valves 30 and 31 are connected together by a yoke 38 which is provided with a recess 39 adapted to receive a valve actuating pin 40. This pin is carried by a short shaft 41 which is rotatably carried in apertured ears 42 and 43 on the valve support. A second pin 44 actuates shaft 41. The shaft is provided with a transverse threaded opening through which pin 44 extends. The pin is threaded over a substantial portion of its length, so that it may be suitably adjusted with respect to shaft 43. The lower end of the pin is preferably notched so that a screw driver or similar device may be used to make the adjustment.

The lower portion of casing 1 is formed to provide a recess 45 within which trigger 46 is pivotally mounted. A link 47 connects the trigger to one end of a sliding rod 48 disposed within a slot extending through the lower portion of the casing. The other end of rod 48 is adapted to engage pin 44 to actuate the same. A second sliding rod 49 is disposed within the slot on the opposite side of pin 44 and a spring 50 is likewise disposed within the slot to bias the pin and normally maintain the valves open. An adjusting screw 51 may be provided at the rear end of the slot to enable the adjusting of the tension of spring 50.

Considering the structure just described, it will be apparent that the valve springs will normally function to withdraw the valves from their seats, and that the force exerted by such springs must be overcome by the pressure exerted upon yoke 38 by pin 40 to close the valves. It will also be obvious that spring 50 will normally exert pressure against rod 49 to maintain pin 40 in inoperative position. When the device is actuated, the operation of the trigger actuates pin 40 against the action of spring 50 to move the valves to their seats against the action of their respective springs. The opening 52 provided in the underside of the casing enables the insertion and adjustment of pin 44 as well as the pivotal movement thereof.

Referring to Fig 7, the device is adapted to receive a suitable glass nozzle 53. While only one such nozzle is disclosed herein, it is to be understood that nozzles of various shapes may be used to treat different portions of the skin. In other words, nozzles having varying shaped mouths to properly engage various portions of a patient's body may be used with the device. Each of the nozzles, however, constitutes a tapered end 54, the outer surface of which is preferably ground so that it frictionally engages the inner surface of tube 10 when attached to the device. Such nozzles are also provided with an integral tube 55 extending within the main body or tube 56 of the nozzle. An integrally extending tube 57 is also provided on each nozzle which is adapted for connection with pipe 27 by means of a suitable rubber hose connection 58. The purpose of tube 55 will be explained later. It will be obvious that it is a simple matter to remove the nozzle and replace it or another in associated relation with the device. It is merely necessary to insert end 54 of the nozzle within tube 10 and also insert tube 57 within the hose connection.

The device may be used and is adapted to operate as follows:—A measured amount of powdered medicinal substance may be poured into retort 9 through a suitable glass funnel provided for that purpose. Such funnel may, of course, extend through tube 10 of the retort, it being understood that the noozle may be removed at this time. The electrical circuit of the heating coil may now be closed to properly heat the medicinal substance and cause the same to vaporize. The vacuum pump is now started and will, of course, draw air through pipes 25 and 27. The mouth of the particular nozzle being used is now placed against the portion of the patient's skin which is to be treated and trigger 46 is actuated to close the valves 30 and 31. Closure of valve 30 closes the passage through tube 12 between chamber 5 and retort 9, while closure of valve 31 prevents the vacuum source from drawing air through pipe 25 from compartment 5. Obviously, the vacuum source will now function to draw air only through pipes 27 and 25 from the area immediately adjacent the portion of the skin being treated. Since tube 55 of the nozzle is restricted in diameter and extends to a point closely adjacent the skin, the exhausting of the vacuum source is exerted almost entirely upon the skin although the air will be at least partially drawn from retort 9. The vacuum created adjacent the skin draws the same firmly against the mouth of the nozzle and produces the desired hyperæmic condition of the skin covered by the mouth of the nozzle.

The trigger is now released and causes the valves to open. The spring of valve 30 is preferably made slightly stronger than the spring of valve 31 so that it exerts slightly greater pulling force upon valve 30 to open it slightly in advance of the opening of valve 31 by its spring. Opening of valve 31 allows the vacuum source to draw air through pipe 25 from chamber 5 and consequently destroys the vacuum previously created adjacent the skin at the end of the nozzle. However, since valve 30 opens slightly in advance of valve 31, the atmospheric pressure existing in compartment 5 causes a rush of air through tube 12 and retort 9 where little if any pressure exists. By virtue of the T head construction of the inner end of tube 12, this inrush of air is distributed through retort 9 and carries the vaporized medicament from the retort through the emission or outlet tube 10. It will be apparent that since a vacuum exists at the end of the nozzle, the air will rush through the nozzle carrying the vaporized medicament with it and will cause the projection of the medicament upon the portion of the skin being treated. By virtue of the construction of tube 55 a jet of vaporized medicament impinges on the skin. The opening of valve 31 occurs almost simultaneously with that of valve 30, but the projection of the vaporized medicament by the device upon the skin is so rapid as to be performed during the existence of the vacuum adjacent the skin. It is, of course, important that the vacuum exists at the time that the medicament substance is projected onto the skin since the efficiency of the device in performing its function would otherwise be materially lessened. The procedure just outlined may be repeated as often as is deemed necessary in any particular instance. In some cases, a single operation will suffice, whereas in others, several repeated operations will be necessary to properly treat the affected skin. The device may be refilled at any time in the manner of filling the same previously described.

After about fifteen treatments, the operator will notice that the rubber tube connecting the vacuum source with the instrument has lost its softness and elasticity. This is due to a coating on the inside of the rubber tube which results from condensation of excess vapor drawn toward the pump. If this is permitted to continue, it will eventually close the tube and prevent the creation of the desired vacuum. It is necessary, therefore, to renew the rubber tube from time to time. However, the life of the rubber tube may be lengthened by cleaning the instrument occasionally which may be accomplished as follows:—A small section of rubber tubing may be connected to the mouth of the device at one end and the other end of the tube submerged in alcohol. By actuating the trigger of the device, the vacuum created will draw alcohol through the instrument to cleanse the same. Some of this alcohol will, of course, flow through the rubber tubing to dissolve the deposit therein. The device may be rinsed with water in a similar manner after the cleansing with alcohol. Condensation of the vapor on the interior of the nozzle also takes place and necessitates the occasional cleaning of the nozzle.

It is important to note the various characteristics of the device disclosed herein which enable it to perform the desired method in a highly efficient manner. By means of the device, it is possible to create the desired vacuum of controllable intensity, the maximum vacuum creatable being equivalent to about twenty inches of mercury. The vascularity of the affected portion of the skin is so increased by the vacuum created that penetration of the medicinal agent actually occurs. The medicinal agent is confined to the space covered by the nozzle, thus minimizing dissipation of the vapor in the atmosphere. The vapor form of the medicinal agent also adds to the certainty of penetration. We have repeatedly demonstrated in clinics and research laboratories that this penetration really occurs and that the epidermal tissues retain the medicinal agent for a considerable period of time.

It is our belief, as a result of considerable clinical experiment, that the use of our device with the proper germicidal agent constitutes a most useful treatment for epidermophytosis and epidermophytids as well as for tinea tonsurans and marks a distinct advance over other local forms of therapy. Since the introduction of this treatment in certain clinics, its use has been extended to include treatment of such pyogenic affections as furunculosis and carbunculosis and some of the more resistant non-follicular pyodermic conditions.

It is obvious that the method of our invention and the device for carrying it out may be used to treat membranous affections generally. For example, it may be applicable to the treatment of mucous membrane affections.

Obviously, while we have disclosed herein a specific preferred embodiment of a device for carrying out the desired method and treatment, various changes in the structural details of the device may be made without departing from the spirit and scope of the invention. Any device which will successfully perform the method contemplated by our invention is deemed to be within the scope thereof. Only such limitations as are included in the appended claims are to be imposed upon the invention.

We claim:

1. A device for treating membranous affections, comprising a medicament storage chamber having an outlet, means for vaporizing the medicament stored therein, means for positioning said outlet in juxtaposition to a portion of the membrane to be treated, means for evacuating the space adjacent said portion, means for forcing said medicament through said outlet to said portion, and means for destroying the vacuum.

2. A device for treating membranous affections, comprising a medicament storage chamber having an inlet and outlet, means for vaporizing the medicament stored therein, means for positioning said outlet in juxtaposition to a portion of the membrane to be treated, means for closing said inlet, means for exhausting the atmosphere from the space adjacent said portion, whereby opening of said closing means causes a rush of air through said chamber to project said medicament on said portion, and means for disabling said exhausting means.

3. A device for treating membranous affections, comprising a medicament storage chamber, an air chamber, a communicating passage between said chambers, an outlet passage from said storage chamber adapted for positioning adjacent a portion of the membrane to be treated, passages leading from atmosphere exhausting means to said air chamber and to the space adjacent said portion, and means for closing said inter-communicating passage and the passage to said air chamber, whereby the atmosphere adjacent said portion may be exhausted and subsequent opening of said closing means causes a rush of air through said storage chamber to project the medicament on said portion.

4. A device for treating membranous affections, comprising a medicament storage chamber, means for vaporizing the medicament therein, an air chamber, a communicating passage between said chambers, an outlet passage from said storage chamber adapted for positioning adjacent a portion of the membrane to be treated, passages leading from atmosphere exhausting means to said air chamber and to the space adjacent said portion, and means for closing said inter-communicating passage and the passage to said air chamber, whereby the atmosphere adjacent said portion may be exhausted and subsequent opening of said closing means causes a rush of air through said storage chamber to project the medicament on said portion.

5. In a device for treating membranous affections, a source of medicative vapor, means for exacuating the space adjacent a portion of the membrane to be treated, and means for causing a sudden rush of air through said source to said portion, whereby said vapor is projected forcibly upon said portion.

6. In a device for treating membranous affections, a source of medicative vapor having an outlet, means for positioning said outlet in juxtaposition to a portion of the membrane to be treated, means for evacuating the space adjacent said portion, and means for causing a sudden rush of air through said source to said portion, whereby said vapor is projected forcibly upon said portion.

ALBERT STRICKLER.
HARRIS COMER.
ARNOLD H. ZIFFERBLATT.